United States Patent
Mortazavi et al.

(10) Patent No.: US 9,898,476 B2
(45) Date of Patent: Feb. 20, 2018

(54) MANAGING LOCK OR LATCH IN CONCURRENT EXECUTION OF QUERIES

(71) Applicant: Futurewei Technologies Inc., Plano, TX (US)

(72) Inventors: Masood Mortazavi, San Jose, CA (US); Mengmeng Chen, San Jose, CA (US); Aniket Adnaik, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 419 days.

(21) Appl. No.: 14/161,388

(22) Filed: Jan. 22, 2014

(65) Prior Publication Data

US 2015/0205812 A1    Jul. 23, 2015

(51) Int. Cl.
*G06F 17/30* (2006.01)
*G06F 9/52* (2006.01)

(52) U.S. Cl.
CPC ........ *G06F 17/30117* (2013.01); *G06F 9/522* (2013.01); *G06F 17/30362* (2013.01); *G06F 17/30584* (2013.01)

(58) Field of Classification Search
CPC .............................................. G06F 17/30489
USPC ................................................. 707/692, 704
See application file for complete search history.

(56) References Cited

U.S. PATENT DOCUMENTS

| | | | | |
|---|---|---|---|---|
| 6,499,129 B1 * | 12/2002 | Srinivasan | .......... | G06F 17/5022 703/13 |
| 6,993,730 B1 * | 1/2006 | Higgins | .............. | G06F 17/5022 716/107 |
| 7,000,202 B1 * | 2/2006 | Srinivasan | ..... | G01B 31/318357 716/106 |
| 8,626,770 B2 * | 1/2014 | He | .................... | G06F 17/30324 707/741 |
| 9,171,044 B2 * | 10/2015 | Schleimer | ......... | G06F 17/30474 707/707 |
| 2007/0088912 A1 * | 4/2007 | Mukherjee | .............. | G06F 3/061 711/112 |
| 2008/0270363 A1 * | 10/2008 | Hunt | ................. | G06F 17/30489 707/707 |
| 2009/0254907 A1 * | 10/2009 | Neary | ................... | G06F 9/5027 718/102 |
| 2010/0211753 A1 * | 8/2010 | Ylonen | ............... | G06F 12/0253 711/165 |

(Continued)

*Primary Examiner* — Robert Beausoliel, Jr.
*Assistant Examiner* — Alexandria Bromell
(74) *Attorney, Agent, or Firm* — Schwegman Lundberg & Woessner, P.A.

(57) ABSTRACT

Various disclosed embodiments include methods and systems for managing lock or latch chains in concurrent execution of database queries. A method includes receiving a plurality of transactions, each transaction associated with one or more queuing requests. The method includes, for each transaction, determining one or more partition sets. Each partition set corresponds to one or more database partitions needed for the transaction. The one or more database partitions are included within a partitioned database. The method includes, for each transaction, determining one or more queues needed for the transaction and storing a bitmap representation of the one or more queues needed for the transaction. The one or more queues needed for the transaction correspond to the one or more database partitions needed for the transaction.

24 Claims, 3 Drawing Sheets

| TRANSACTION | NEEDED PARTITION SET | LOCK CHAIN SEQUENCE |
|---|---|---|
| S6 (TA) | {3, 1, 8, 7} | 1 2 3 4 5 6 7 8 9 10 |
| S5 (TB) | {8, 2, 5} | 1 2 3 4 5 6 7 8 9 10 |
| S4 (TC) | {9} | 1 2 3 4 5 6 7 8 9 10 |
| S3 (TB) | {6, 7} | 1 2 3 4 5 6 7 8 9 10 |
| S2 (TD) | {1, 4, 5} | 1 2 3 4 5 6 7 8 9 10 |
| S1 (TE) | {2, 3, 8} | 1 2 3 4 5 6 7 8 9 10 |

(56) References Cited

U.S. PATENT DOCUMENTS

| | | | |
|---|---|---|---|
| 2010/0332454 A1* | 12/2010 | Prahlad | G06F 17/30082 |
| | | | 707/654 |
| 2011/0219208 A1* | 9/2011 | Asaad | G06F 15/76 |
| | | | 712/12 |
| 2014/0114933 A1* | 4/2014 | Chandrasekarasastry | |
| | | | G06F 12/02 |
| | | | 707/692 |
| 2014/0359248 A1* | 12/2014 | Peters | G06F 12/0223 |
| | | | 711/171 |

* cited by examiner

| TRANSACTION | NEEDED PARTITION SET | LOCK CHAIN SEQUENCE |
|---|---|---|
| S6 (TA) | {3, 1, 8, 7} | 1 2 3 4 5 6 7 8 9 10 |
| S5 (TB) | {8, 2, 5} | 1 2 3 4 5 6 7 8 9 10 |
| S4 (TC) | {9} | 1 2 3 4 5 6 7 8 9 10 |
| S3 (TB) | {6, 7} | 1 2 3 4 5 6 7 8 9 10 |
| S2 (TD) | {1, 4, 5} | 1 2 3 4 5 6 7 8 9 10 |
| S1 (TE) | {2, 3, 8} | 1 2 3 4 5 6 7 8 9 10 |

| TRANSACTION | NEEDED PARTITION SET | LOCK CHAIN SEQUENCE |
|---|---|---|
| S6 (TA) | {3, 1, 8, 7} | 1 0 1 0 0 0 1 1 0 0 |
| S5 (TB) | {8, 2, 5} | 0 1 0 0 1 0 0 1 0 0 |
| S4 (TC) | {9} | 0 0 0 0 0 0 0 0 1 0 |
| S3 (TB) | {6, 7} | 0 0 0 0 0 1 1 0 0 0 |
| S2 (TD) | {1, 4, 5} | 1 0 0 1 1 0 0 0 0 0 |
| S1 (TE) | {2, 3, 8} | 0 1 1 0 0 0 0 1 0 0 |

|   | REMAINING   |
|---|-------------|
| S6 | 1 0 1 0 0 0 1 1 0 0 |
| S5 | 0 1 0 0 1 0 0 1 0 0 |
| S4 | 0 0 0 0 0 0 0 0 1 0 |
| S3 | 0 0 0 0 0 1 1 0 0 0 |
| S2 | 0 0 0 1 1 0 0 0 0 0 |
| S1 | 0 0 1 0 0 0 0 1 0 0 |
FIG. 6
|   | OPEN |
|---|------|
|   | 1 0 1 0 0 0 1 1 0 0 |
|   | 0 1 0 0 1 0 0 1 0 0 |
|   | 0 0 0 0 0 0 0 0 1 0 |
|   | 0 0 0 0 0 1 1 0 0 0 |
|   | 0 0 0 1 1 0 0 0 0 0 |
|   | 0 0 1 0 0 0 0 1 0 0 |
FIG. 7
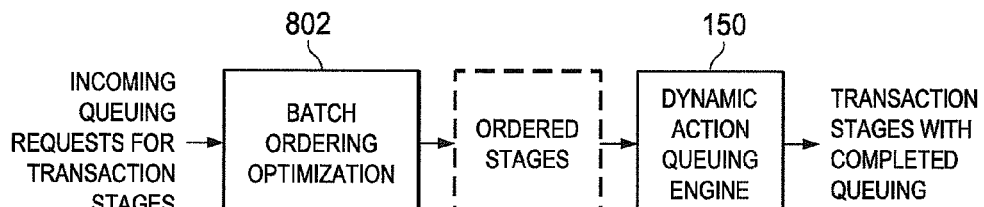
FIG. 8
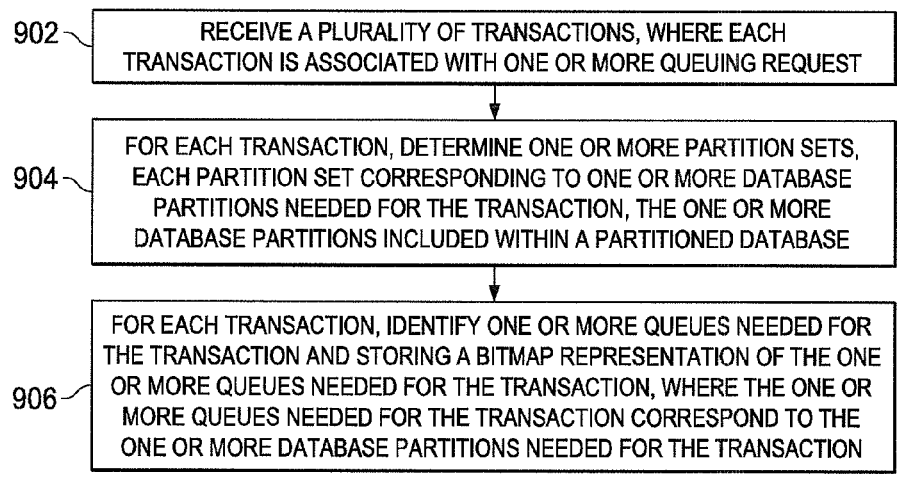
FIG. 9

MANAGING LOCK OR LATCH IN CONCURRENT EXECUTION OF QUERIES

TECHNICAL FIELD

The present disclosure relates generally to partitioned database systems, and more particularly to a mechanism for managing lock or latch chains in concurrent execution of database queries.

BACKGROUND

In highly partitioned databases, the use of lock chains/latches has been proposed to improve concurrency. For example, a data-oriented architecture (DORA) that exhibits predictable access patterns by binding worker threads to disjoint subsets of a database, distributing the work of each transaction across transaction-executing threads according to the data accessed by the transaction, and avoiding interactions with a centralized lock manager as much as possible during request execution has been proposed by I. Pandis, R. Johnson, N. Hardavellas and A. Ailamaki, *Data-Oriented Transaction Execution*, Proceedings of the VLDB Endowment, Vol. 3, No. 1, 2010, which is hereby incorporated by reference into the present application as if fully set forth herein.

SUMMARY

According to one embodiment, there is provided a method for managing a lock chain in concurrent transaction and query execution of a database in a data-oriented execution. The method includes receiving a plurality of transactions, each transaction associated with one or more queuing requests. The method includes, for each transaction, determining one or more partition sets. Each partition set corresponds to one or more database partitions needed for the transaction. The one or more database partitions are included within a partitioned database. The method includes, for each transaction, determining one or more queues needed for the transaction and storing a bitmap representation of the one or more queues needed for the transaction. The one or more queues needed for the transaction correspond to the one or more database partitions needed for the transaction.

In another embodiment, there is provided an apparatus for managing a lock chain in concurrent transaction and query execution of a database in a data-oriented execution. The apparatus includes a processor and memory coupled to the processor. The apparatus is configured to receive a plurality of transactions, each transaction associated with one or more queuing requests. The apparatus is configured to, for each transaction, determine one or more partition sets. Each partition set corresponds to one or more database partitions needed for the transaction. The one or more database partitions are included within a partitioned database. The apparatus is configured to, for each transaction, determine one or more queues needed for the transaction and store a bitmap representation of the one or more queues needed for the transaction. The one or more queues needed for the transaction correspond to the one or more database partitions needed for the transaction.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 6 illustrates a matrix including a bitmap of remaining queues after an enqueueing operation has been performed using the dynamic action queuing engine according to the present disclosure;

FIG. 7 illustrates a matrix including a bitmap of open queues after an enqueueing operation has been performed using the dynamic action queuing engine according to the present disclosure that shows which queues each of the in-flight stages S1-S6 can acquire in a subsequent enqueueing operation;

FIG. 8 illustrates a diagrammatic view involving batch re-ordering of incoming transaction stages; and FIG. 9 illustrates a flow diagram illustrating a method of managing a lock chain in concurrent transaction and query execution of a partitioned database according to one embodiment.

DETAILED DESCRIPTION

Figure 1:
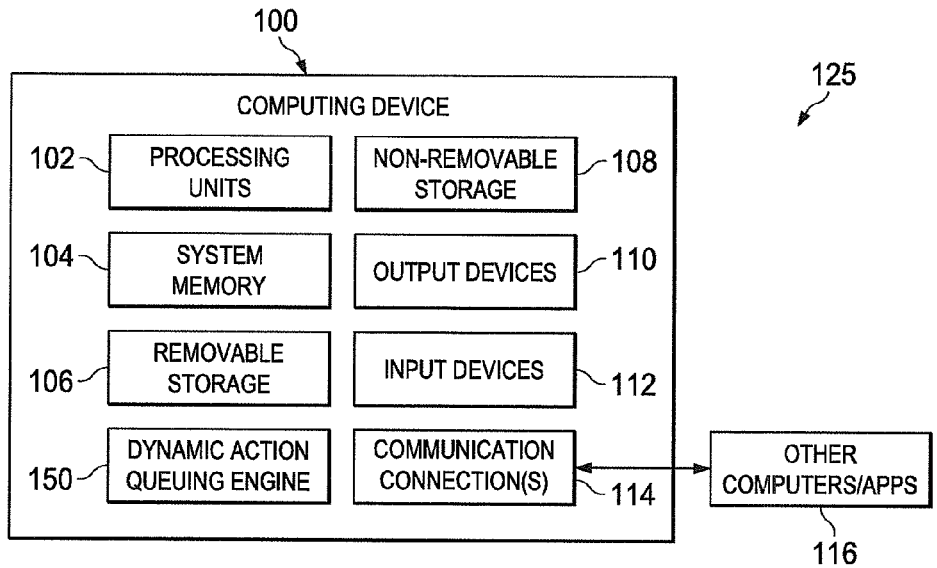
FIG. 1 illustrates a system including a computing device suitable for managing a lock chain in concurrent transaction and query execution of a partitioned database according to one embodiment.

FIG. 1 is a diagram illustrating a system 125 including a computing device 100 suitable for performing concurrent execution of queries according to one embodiment. In the illustrated embodiment, the computing device 100 includes a processing unit 102 and system memory 104. The processing unit 102 may be a general purpose, special purpose or digital signal processor, and may be a plurality of processors or combination of such processors. The memory 104 may be volatile (such as random access memory (RAM), non-volatile (such as read only memory (ROM), flash memory, etc.), or some combination of the two depending on the configuration and type of computing device.

The computing device 100 may also have additional features/functionality. For example, the computing device 100 may also include additional storage (removable and/or non-removable) including, but not limited to, magnetic or optical disks or tape. Such additional storage is illustrated in FIG. 1 by removable storage 106 and non-removable storage 108. Computer storage media includes volatile and non-volatile, removable and non-removable media implemented in any suitable method or technology for storage of information such as computer readable instructions, data structures, databases, program modules or other data. The memory 104, the removable storage 106 and the non-removable storage 108 are all examples of computer storage media. The computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing device 100. Any such computer storage media may be part of the computing device 100.

The computing device 100 includes one or more communication connections 114 that allow the computing device 100 to communicate with other computers/applications 116. The computing device 100 may also include input device(s) 112, such as a keyboard, a pointing device (e.g., a mouse), a pen, a voice input device, a touch input device, etc. The computing device 100 may also include output device(s) 110, such as a display, speakers, a printer, etc.

In one embodiment, computing device 100 includes a dynamic action queuing engine 150. The dynamic action queuing engine 150 is described in further detail below with reference to FIG. 2.

Figure 2:
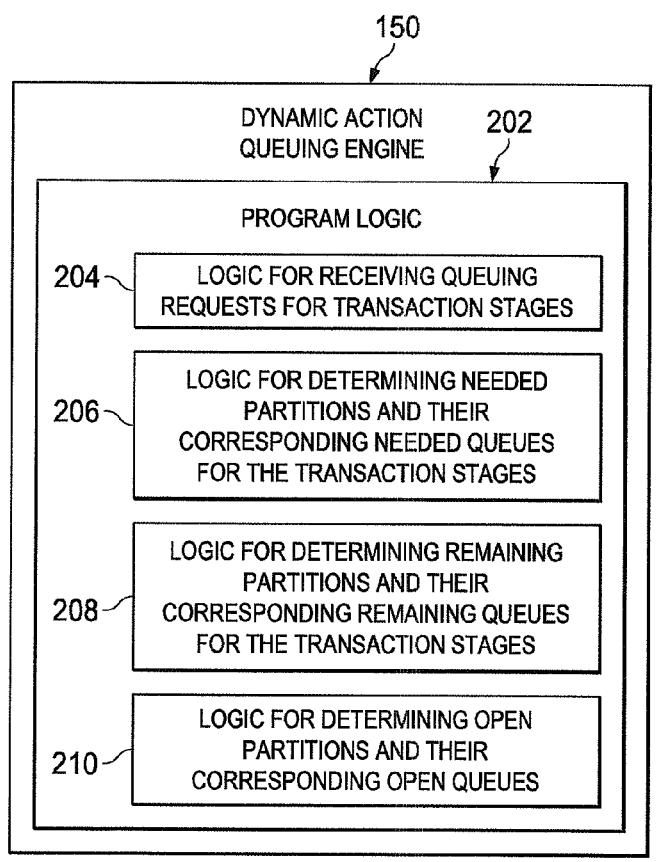
FIG. 2 illustrates a diagrammatic view of one embodiment of a dynamic action queuing engine for operation on the computing device illustrated in FIG. 1.

FIG. 2 is a diagrammatic view of one embodiment of a dynamic action queuing engine 150 for operation on the computing device 100 illustrated in FIG. 1. The dynamic action queuing engine 150 may be one of the application programs that reside on the computing device 100. However, the dynamic action queuing engine 150 can alternatively or additionally be embodied as computer-executable instructions on one or more computers and/or in different variations than illustrated in FIG. 1. Alternatively or additionally, one or more parts of the dynamic action queuing engine 150 can be part of the system memory 104, on other computers and/or applications 116, or other such suitable variations as would occur to one in the computer software art.

The dynamic action queuing engine 150 includes program logic 202, which is responsible for carrying out some or all of the techniques described herein. Program logic 202 includes logic 204 for receiving queuing requests for transaction stages; logic 206 for determining needed partitions and their corresponding needed queues for the transaction stages; logic 208 for determining remaining partitions and their corresponding remaining queues for the transaction stages; and logic 210 for determining open partitions and their corresponding open queues.

Figures 3, 4, 5:
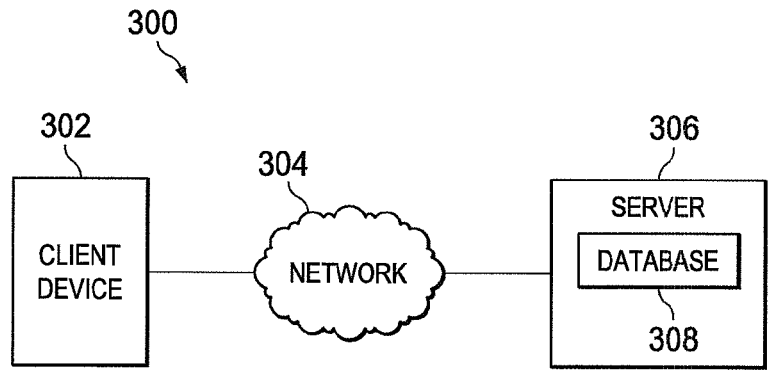
FIG. 3 illustrates an example of an information processing system for implementing aspects in accordance with various embodiments.
FIG. 4 illustrates an example of managing a lock chain in concurrent transaction and query execution of a partitioned database using a naïve model.
FIG. 5 illustrates an example of managing a lock chain in concurrent transaction and query execution of a partitioned database using a dynamic action queuing engine according to the present disclosure.

FIG. 3 illustrates an example of an information processing system 300 for implementing aspects in accordance with various embodiments. The system 300 includes a client device 302, which can include any appropriate device operable to send and receive requests, messages, or information over an appropriate network 304 and convey information back to a user of the client device 302. Examples of such devices include personal computers, cellular phones, handheld messaging devices, laptop computers, tablets, set-top boxes, personal data assistants, electronic book readers, and the like.

The network 304 can include any appropriate network, including an intranet, the Internet, a cellular network, a local area network, or any other such network or combination thereof. Protocols and components for communicating via such a network are well known and will not be discussed herein in detail. Communication over the network can be enabled by wired or wireless connections, and combinations thereof.

The system 300 includes a server 306 and a database 308. The server 306 may include an operating system that provides executable program instructions for the general administration and operation of that server, and typically will include a computer-readable medium storing instructions that, when executed by a processor of the server 306, allow the server 306 to perform its intended functions. Suitable implementations for the operating system and general functionality of the servers are known or commercially available, and are readily implemented by persons having ordinary skill in the art.

The server 306 may include the database 308. The database 308 can include several separate data tables, databases, or other data storage mechanisms and media for storing data relating to a particular aspect. The database 308 is operable, through logic associated therewith, to receive instructions from the server 306 and obtain, update, or otherwise process data in response thereto. As illustrated, the database 308 resides in the server 306. However, the database 308 can alternatively or additionally be embodied on one or more computers separate from the server 306 and/or in different variations than illustrated in FIG. 3.

FIG. 4 illustrates an example of managing a lock chain in concurrent transaction and query execution of a partitioned database using a "naïve" model. The model is referred to as naïve because the lock chain sequence is traversed sequentially in pairs of partitions based on receipt of one or more transactions. Each transaction includes a set of actions that are associated with corresponding action queues of one or more of the partitions. The set of actions may be associated with action queuing requests associated with acquiring locks on the action queues of one or more of the partitions. These locks are obtained in pairs and the lock-pair progresses sequentially through action queues of all partitions in the naïve model. A lock-pair, instead of a single lock, is acquired because an earlier transaction must enqueue its actions prior to later transactions, and the first of the two locks in the lock-pair behaves as a barrier to later transactions' speeding ahead of an earlier transaction. The set of actions can be divided into multiple subsets or stages which can be interleaved with other stages from other transactions. Accordingly, each stage may be associated with one or more queuing requests.

The lock chain sequence is traversed sequentially from a first partition in the chain to a last partition in the chain. In the illustrated example of FIG. 4, the actions have been divided into multiple stages and each of ten partitions of the database is associated with a corresponding action queue, forming a lock chain sequence having ten queues associated with the ten partitions for each stage. There are six stages (S1-S6) in the illustrated example. The stages S1-S6 are so numbered because they have been serialized as such by a serialization subsystem in a transaction processing system. The serialization subsystem determines how actions can be performed in alternative series that are substantially semantically equivalent.

In general, the ordering of stages (or transactions if the actions have not been divided into multiple stages) is determined by transaction arrival time. However, when transactions can be divided into multiple stages, these stages can be interleaved. A stage $S_i$ may arrive at the lock chains before a stage $S_j$ if $i<j$. Although ten partitions and six stages are depicted for ease of illustration, there may be fewer or greater than ten partitions and/or fewer or greater than six stages in other implementations. It will be appreciated that in most practical cases, the number of partitions may be as large as the number of cores, each core running the thread-set protecting and processing a given partition's action queue. The present disclosure can apply as well to shared-disk or shared-persistence-store as well as distributed non-shared-disk or non-shared-persistence-store environments.

A plurality of queuing requests may be received such that a first stage S1 is associated with transaction Te and with a first partition set that includes partitions 2, 3 and 8; a second stage S2 is associated with transaction Td and with a second partition set that includes partitions 1, 4 and 5; a third stage S3 is associated with transaction Tb and with a third partition set that includes partitions 6 and 7; a fourth stage S4 is associated with a transaction Tc and with a fourth partition set that includes partition 9; a fifth stage S5 is associated with the transaction Tb and with a fifth partition set that includes partitions 8, 2 and 5; and a sixth stage S6 is associated with a transaction Ta and with a sixth partition set that includes partitions 3, 1, 8 and 7.

The order of stages must be respected on partitions that may be shared by multiple stages. Accordingly, actions of an earlier arriving stage at the lock chains must be enqueued before actions of a later arriving stage. For example, because the first stage S1 arrives at the lock chains before the second stage S2, the action queues associated with the first stage S1 must be enqueued before the action queues associated with the second stage S2 on all partitions. Similarly, because the second stage S2 arrives at the lock chains before the third stage S3, the action queues associated with the second stage S2 must be enqueued before the action queues associated with the third stage S3 on all partitions, the action queues associated with the third stage S3 must be enqueued before the action queues associated with the fourth stage S4 on all partitions, etc.

To illustrate, during operation using the naïve model, the first stage S1 is received and the action queues for partitions 1 and 2 are acquired. Thereafter, the action queues for partitions 1 and 2 are locked. The action queue of partition 1 is acquired or locked using the naïve model even though the first stage S1 is not associated with partition 1 (e.g., the first stage S1 is associated with transaction Te and partitions 2, 3 and 8). Thereafter, the action queue of partition 1 is enqueued (e.g., released or unlocked) and the first stage attempts to acquire the action queue for partition 3. Note that the first stage S1 is still "holding" partition 2 (e.g., the action queue for partition 2 is still acquired or locked).

Because the action queue of partition 1 has been released or unlocked, the second stage S2 can acquire the action queue of partition 1. In the meantime, in response to the action queue of partition 2 being enqueued, the first stage attempts to acquire the action queue for partition 4 (while still holding the action queue of partition 3), and the second stage S2 can acquire the action queue of partition 2. The remainder of the lock chain for the first stage S1 and the second stage S2 is traversed sequentially in pairs of queues in a similar manner. Similarly, the lock chain for each subsequent stage is traversed sequentially in pairs of queues from a first queue in the chain to a last queue in the chain in a similar manner. Use of the naïve model results in delays because of unnecessary queues being acquired on unused partitions.

FIG. 5 illustrates an example of managing a lock chain in concurrent transaction and query execution of a partitioned database using a dynamic action queuing engine application according to the present disclosure. In FIG. 5, the lock chain sequence of FIG. 4 is illustrated as a matrix including a bitmap format, where a "1" is placed in queues associated with partitions that will receive an action from a given transaction stage. In an active matrix bit map, columns represent data partitions and associated action queues, and rows represent a list of actions on those partitions for a given transaction stage.

For example, the system 125 of FIG. 1 associated with the dynamic action queuing engine 150 according to the present disclosure is configured to receive a plurality of transactions as described above with respect to FIG. 4. The system 125 is configured to determine transaction and partition combinations associated with database queries, and to identify those queues associated with partitions in which an action has been selected such as by placing a "1" in the bitmap to designate the identified queues. Alternatively, a "0" may be placed in the bitmap to designate the identified queues where either no action is to be enqueued for a given transaction stage or where the transaction stage has completed enqueueing any action it may have had for the corresponding partition. The identified queues may be referred to as "needed" queues—e.g., queues that are associated with partitions that are needed for a given transaction or a given stage of a transaction. A partition or queue is needed by a transaction when a transaction has an action that it can enqueue on that partition. In a particular implementation, the needed queues comprise a bitmap of needed queues for a given transaction or a given stage of a transaction in the form of a needed queues matrix.

As an illustrative example, the system 125 is configured to determine that partitions 2, 3 and 8 are needed for stage 1 (S1); partitions 1, 4 and 5 are needed for stage 2 (S2); partitions 6 and 7 are needed for stage 3 (S3); partition 9 is needed for stage 4 (S4), etc. Because partitions 2, 3 and 8 are needed for stage 1 (S1), a "1" is placed in the bitmap representing queues 2, 3 and 8 in the lock chain for stage 1 (S1). Similarly, because partitions 1, 4 and 5 are needed for stage 2 (S2), a "1" is placed in the bitmap representing queues 1, 4 and 5 in the lock chain for stage 2 (S2); because partitions 6 and 7 are needed for stage 3 (S3), a "1" is placed in the bitmap representing queues 6 and 7 in the lock chain for stage 3 (S3); because partition 9 is needed for stage 4 (S4), a "1" is placed in the bitmap representing queue 9 in the lock chain for stage 4 (S4); because partitions 8, 2 and 5 are needed for stage 5 (S5), a "1" is placed in queues 1, 4 and 5 in the lock chain for stage 5 (S5); and because partitions 3, 1, 8 and 7 are needed for stage 6 (S6), a "1" is placed in queues 3, 1, 8 and 7 in the lock chain for stage 6 (S6).

After all of the needed partitions and queues are determined for the stages S1-S6 at a particular point in time, the system is configured to determine remaining partitions and their corresponding remaining queues for the transaction stages. The remaining queues include one or more needed queues that have not yet been enqueued after an enqueueing operation has been performed. In a particular implementation, the remaining queues comprise a remaining queues matrix that includes a bitmap of remaining queues for a given stage of a transaction. For example, FIG. 6 illustrates matrix that includes a bitmap of remaining queues after an enqueueing operation has been performed.

To illustrate, as described above with respect to FIG. 4, actions of an earlier arriving stage at the lock chains must be enqueued before actions of a later arriving stage. As such, queue 1 of stage 2 (S2) and queue 2 of stage 1 (S1) must be enqueued before queue 1 of stage 6 (S6) and queue 2 of stage 5 (S5), respectively. It will be appreciated that a "window size" of the matrix of FIG. 6 (e.g., six rows and ten columns) may be fixed, and that rows of remaining queues may be passed through into the remaining queues matrix. For example, when a stage's row in the remaining queues matrix becomes all "0's", that stage has been "serviced" and the row can now be updated and assigned to a new incoming transaction. As such, in the example illustrated in FIG. 6, rows S1 and S2 may be "left over" from a previous enqueueing operation and rows S3-S6 may have been updated and assigned a new incoming transaction.

For example, FIG. 6 illustrates that after an enqueueing operation has been performed on the needed queues of FIG.

5, queue 2 of stage 1 (S1) and queue 1 of stage 2 (S2) have been enqueued (e.g., the "1" in queue 2 of stage 1 (S1) and the "1" in queue 1 of stage 2 (S2) of FIG. 5 have been "flipped" to "0" (as highlighted by the "underscore" (e.g., "$\underline{0}$"))), and that one or more of the needed queues of FIG. 5 have not yet been enqueued (e.g., "1's" in queues 3 and 8 of stage 1 (S1); "1's in queues 4 and 5 of stage 2 (S2); "1's" in queues 6 and 7 of stage 3 (S3); "1" in queue 9 of stage 4 (S4); "1's" in queues 2, 5 and 8 of stage 5 (S5); and "1's" in queues 1, 3, 7 and 8 of stage 6 (S6)).

After determining the needed queues and the remaining queues, the system is configured to determine open partitions and their corresponding open queues based on the needed queues and the remaining queues. The open queues are associated with needed queues that have not yet been enqueued and are associated with queues that each stage can acquire and enqueue at a subsequent point in time (e.g., during a next sequential enqueueing operation). In a particular implementation, the open queues comprise an open queues matrix that includes a bitmap of open queues for a given stage of a transaction.

For example, FIG. 7 illustrates a matrix including a bitmap of open queues after an enqueueing operation has been performed using the dynamic action queuing engine according to the present disclosure that shows which queues each of the in-flight stages S1-S6 can acquire in a subsequent enqueueing operation. Queues illustrated as having a "$\underline{1}$" (e.g., a "1" with an underscore) in FIG. 7 are needed queues that will be acquired and enqueued during the next enqueueing operation as described in further detail below. Queues illustrated as having a "1" (e.g., a "1" with no underscore) in FIG. 7 are needed queues that are subject to a barrier condition as discussed in greater detail below and are queues that will not be acquired and enqueued during the next sequential enqueueing operation.

In order to determine which queues will be acquired and enqueued during the next enqueueing operation, the remaining queues matrix of FIG. 6 may be scanned from the bottom row (e.g., the row corresponding to stage 1 (S1)) to the top row (e.g., the row corresponding to stage 6 (S6)) to determine whether a barrier condition exists. In a particular implementation, a barrier condition exists if two rows have "1's" in the same column (e.g., two stages need to acquire the same partition or queue). If a barrier condition exists, the later stage may not acquire the partition or queue until the earlier stage has done so.

To illustrate, if the rows of the remaining queues matrix of FIG. 6 are scanned from bottom to top, it can be seen that a barrier condition exists in stage 5, partition 8 because an earlier stage (e.g., stage 1) needs partition 8. Similarly, a barrier condition exists in stage 6, partitions 3, 7 and 8 because one or more earlier stages need one or more of those partitions. Accordingly, the queues illustrated as having a "1" (e.g., a "1" with an underscore) in FIG. 7 will be acquired and enqueued during the next enqueueing operation. The queues illustrated as having a "1" (e.g., a "1" with no underscore) in FIG. 7 are needed queues that are subject to a barrier condition and will not be acquired and enqueued during the next enqueueing operation.

Although not illustrated, it will be appreciated that after the next enqueueing operation, each of the rows S1-S4 will have all "0's" and each of those rows can be assigned to a new incoming transaction that may be re-serialized in a "new" needed queues matrix. Similarly, the rows associated with the queues subject to the barrier conditions (e.g., rows S5 and S6) may be re-serialized in the "new" needed queues matrix. In a particular implementation, once enqueueing activity starts on a batch of rows, a particular row can only be deleted when all of its actions have been completed (usually, this means that the row can be dropped from the bottom of the matrix), and new batches (or new single rows) can only be added from the top of the matrix. The trade-off between adding single rows at a time, from the top, or a new batch is an optimization trade off and can be accomplished through common combinatorial optimization techniques.

In a particular implementation, batch processing may be utilized in order to optimize ordering in batches of in-flight transactions prior to the transactions being processed by the dynamic action queuing engine 150 so that matrices do not need to be resized constantly. Alternatively, the batch may be resized. Minimal matrices may be specified for even more efficient real-time and dynamic processing when throughput is lower. In addition, as described above, the window size of the matrix operations may be fixed, and rows of remaining queues may be passed through into the remaining queues matrix. When a stage's row in the remaining queues matrix becomes all "0's", the corresponding transaction stage has been serviced and the row can be recycled and assigned to a new incoming transaction. In such a case, the row takes its place as the first row of the matrix and the rest of the matrix "shifts" down, effectively adding +1 to the index of each row, and the new index of each row can be computed as such: $Index_{new}=(Index_{old}+1)\% N$, where "%" represents "modula" operation and "N" represents the total number of rows in the active bitmap matrix or window.

Batch optimization may be performed where transactions are re-ordered for efficiency. In a particular implementation, re-ordering is permitted only among those rows of the needed queues matrix none of whose actions have been enqueued yet. Once enqueueing activity starts on a batch of rows, they can no longer be sorted. Various techniques may be used for batch optimization, including (1) linear programming and (2) use of a random search (using one of various cost-minimization techniques) for optimal ordering of transactions with the cost determined by the number of queues needed to clear all transactions in the batch as non-limiting examples. In other words, cost minimization is sought, or maximizing the ratio of the number of transactions in the batch to the number of queue acquisition cycles required before all latch chains are traversed.

For example, batch re-ordering may be performed based on sorting according to the cardinality of the needed set of partitions or queues for each stage (i.e., row-sort the batch matrix based on the number of "1's" in each of the rows). In other words, stages with the largest number of needed partitions or queues can go first. Note that enqueueing of actions is always much faster than the actual execution of actions, and the batch re-ordering mechanism described herein is concerned with the enqueueing of actions. Alternatively, or in addition, batch re-ordering may be performed based on a determination of stages with intersecting partitions or queues. For example, the distance between stages having intersecting partitions or queues may be increased and the distance may be inversely proportional to the size of the intersection set. In other words, the distance between rows that have "1's" in the same column may be increased in order to maximize the number of non-intersections in sequential sub-batches.

FIG. 8 illustrates a diagrammatic view involving batch re-ordering of incoming transaction stages. A batch ordering optimization engine 802 receives incoming queuing requests for transaction stages. The batch ordering optimization engine 802 is configured to re-order the transaction stages based on the batch optimization techniques described above.

The re-ordered transaction stages may be received by the dynamic action queuing engine 150. The dynamic action queuing engine 150 is configured to determine needed partitions and their corresponding needed queues for the transaction stages, determine remaining partitions and their corresponding remaining queues for the transaction stages, and determine open partitions and their corresponding open queues, as described above. The dynamic action queuing engine 150 is configured to output transaction stages with completed queuing.

FIG. 9 is a flow diagram illustrating a method 900 of managing a lock chain in concurrent transaction and query execution of a partitioned database according to one embodiment. In some implementations, the techniques illustrated in FIG. 9 are at least partially implemented in the operating logic of the computing device 100 of FIG. 1. A plurality of transactions is received, at 902. Each transaction is associated with one or more queuing requests.

One or more partition sets is determined for each transaction, at 904. Each partition set corresponds to one or more database partitions needed for the transaction, the one or more database partitions included within a partitioned database.

For each transaction, one or more queues needed for the transaction is determined and a bitmap representation is stored of the one or more queues needed for the transaction, at 906. The one or more queues needed for the transaction correspond to the one or more database partitions needed for the transaction.

For example, the system (e.g., the system 125 of FIG. 1; the information processing system 300 of FIG. 3) is configured to determine transaction and partition combinations associated with database queries and based thereon, to determine needed partitions and their corresponding needed queues. The needed queues are represented in a bitmap data structure. The bitmap data structure comprises a needed queues matrix that includes a bitmap of needed queues for a given transaction. For example, the system is configured to place a "1" or a "0" in needed queues associated with the partitions that are needed for a given transaction.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for managing a lock chain in concurrent transaction and query execution of a partitioned database, the method comprising:
   receiving a plurality of transactions, each transaction associated with one or more queuing requests;
   for each transaction, determining one or more partition sets, each partition set corresponding to one or more database partitions needed for the transaction, the one or more database partitions included within a partitioned database;
   for each transaction, determining one or more queues needed for the transaction and storing a bitmap representation of the one or more queues needed for the transaction, wherein the one or more queues needed for the transaction correspond to the one or more database partitions needed for the transaction; and
   storing a needed queues matrix, the needed queues matrix comprising the stored bitmap representation of each of the plurality of transactions, wherein each of the plurality of transactions is associated with at least one row of the needed queues matrix, wherein a size of the needed queues matrix is fixed such that when a row of the at least one row of a remaining queues matrix has been serviced, the row is updated and assigned to a new incoming transaction, the remaining queues matrix corresponds to the needed queues matrix and denotes those queues of the needed queues matrix on which corresponding actions were not enqueued during an immediately previous enqueueing operation.

2. The method in accordance with claim 1, further comprising, in response to an enqueueing operation being performed on the needed queues matrix, storing the remaining queues matrix.

3. The method in accordance with claim 2, further comprising determining an open queues matrix, wherein the open queues matrix corresponds to the remaining queues matrix and includes needed queues that have not yet been enqueued and that have been identified as queues on which transaction stage actions will be enqueued during the next sequential enqueueing operation.

4. The method in accordance with claim 3, wherein determining the open queues matrix comprises analyzing the remaining queues matrix to determine whether a barrier is detected so as to identify a maximal set of actions that can be enqueued during the next sequential enqueueing operation while conserving an invariant which requires actions of a first row in the remaining queues matrix to be enqueued prior to actions of a second row in the remaining queues matrix on the corresponding queues, wherein the first row is below the second row.

5. The method in accordance with claim 4, wherein determining whether the barrier is detected comprises determining whether a first action in the first row of the remaining queues matrix that has not yet been enqueued and a second action in the second row of the remaining queues matrix that has not yet been enqueued are in the same column of the remaining queues matrix, wherein the first action is associated with at least a portion of a first transaction that arrives at the lock chain prior to a second transaction that is associated with the second action.

6. The method in accordance with claim 5, further comprising, in response to determining that the barrier is not detected, enqueueing the first action and the second action during the next sequential enqueueing operation.

7. The method in accordance with claim 5, further comprising, in response to detecting the barrier, enqueueing only the first action during the next sequential enqueueing operation.

8. The method in accordance with claim 2, further comprising deleting a row of the remaining queues matrix in response to determining that each queue in the row is not a needed queue.

9. The method in accordance with claim 2, further comprising replacing an initial row of the remaining queues matrix with another row that corresponds to a new transaction in response to determining that each queue in the initial row is not a needed queue.

10. The method in accordance with claim 1, further comprising, prior to performing an enqueueing operation on the needed queues matrix, performing batch analysis on the received transactions to re-order the received transactions.

11. The method in accordance with claim 10, wherein performing the batch analysis includes sorting the plurality of transactions according to a cardinality of a needed set of queues for each transaction.

12. The method in accordance with claim 10, wherein performing the batch analysis includes sorting the plurality of transactions based on a determination of whether a first needed queue in a first row of the needed queues matrix and a second needed queue in a second row of the needed queues matrix are in a same column of the needed queues matrix.

13. An apparatus for managing a lock chain in concurrent transaction and query execution of a database in a data-oriented execution comprising:
   a processor;
   memory coupled to the processor;
   wherein the apparatus is configured to:
      receive a plurality of transactions, each transaction associated with one or more queuing requests;
      for each transaction, determine one or more partition sets, each partition set corresponding to one or more database partitions needed for the transaction, the one or more database partitions included within a partitioned database;
      for each transaction, determine one or more queues needed for the transaction and storing a bitmap representation of the one or more queues needed for the transaction, wherein the one or more queues needed for the transaction correspond to the one or more database partitions needed for the transaction; and
      store a needed queues matrix, the needed queues matrix comprising the stored bitmap representation of each of the plurality of transactions, wherein each of the plurality of transactions is associated with at least one row of the needed queues matrix, wherein a size of the needed queues matrix is fixed such that when a row of the at least one row of a remaining queues matrix has been serviced, the row is updated and assigned to a new incoming transaction, the remaining queues matrix corresponds to the needed queues matrix and denotes those queues of the needed queues matrix on which corresponding actions were not enqueued during an immediately previous enqueueing operation.

14. The apparatus in accordance with claim 13, wherein the apparatus is further configured to:
   in response to an enqueueing operation being performed on the needed queues matrix, store the remaining queues matrix.

15. The apparatus in accordance with claim 14, wherein the apparatus is further configured to:
   determine an open queues matrix, wherein the open queues matrix corresponds to the remaining queues matrix and includes needed queues that have not yet been enqueued and that have been identified as queues on which transaction stage actions will be enqueued during the next sequential enqueueing operation.

16. The apparatus in accordance with claim 15, wherein the apparatus is further configured to:
   analyze the remaining queues matrix to determine whether a barrier is detected so as to identify a maximal set of actions that can be enqueued during the next sequential enqueueing operation while conserving an invariant which requires actions of a first row in the remaining queues matrix to be enqueued prior to actions of a second row in the remaining queues matrix on the corresponding queues, wherein the first row is below the second row.

17. The apparatus in accordance with claim 16, wherein the apparatus is further configured to:
   determine whether a first action in the first row of the remaining queues matrix that has not yet been enqueued and a second action in the second row of the remaining queues matrix that has not yet been enqueued are in the same column of the remaining queues matrix, wherein the first action is associated with at least a portion of a first transaction that arrives at the lock chain prior to a second transaction that is associated with the second action.

18. The apparatus in accordance with claim 17, wherein the apparatus is further configured to:
   enqueue the first action and the second action during the next sequential enqueueing operation in response to no barrier being detected.

19. The apparatus in accordance with claim 17, wherein the apparatus is further configured to:
   enqueue only the first action during the next sequential enqueueing operation in response to detecting the barrier.

20. The apparatus in accordance with claim 14, wherein the apparatus is further configured to:
   delete a row of the remaining queues matrix in response to determining that each queue in the row is not a needed queue.

21. The apparatus in accordance with claim 14, wherein the apparatus is further configured to:
   replace an initial row of the remaining queues matrix with another row corresponding to a new transaction in response to determining that each queue in the initial row is not a needed queue.

22. The apparatus in accordance with claim 13, wherein the apparatus is further configured to:
   prior to an enqueueing operation being performed on the needed queues matrix, perform batch analysis on the received transactions to re-order the received transactions.

23. The apparatus in accordance with claim 22, wherein the apparatus is further configured to:
   sort the plurality of transactions according to a cardinality of a needed set of queues for each transaction.

24. The apparatus in accordance with claim 22, wherein the apparatus is further configured to:

sort the plurality of transactions based on a determination of whether a first needed queue in a first row of the needed queues matrix and a second needed queue in a second row of the needed queues matrix are in a same column of the needed queues matrix.

* * * * *